United States Patent Office 3,305,139
Patented Feb. 21, 1967

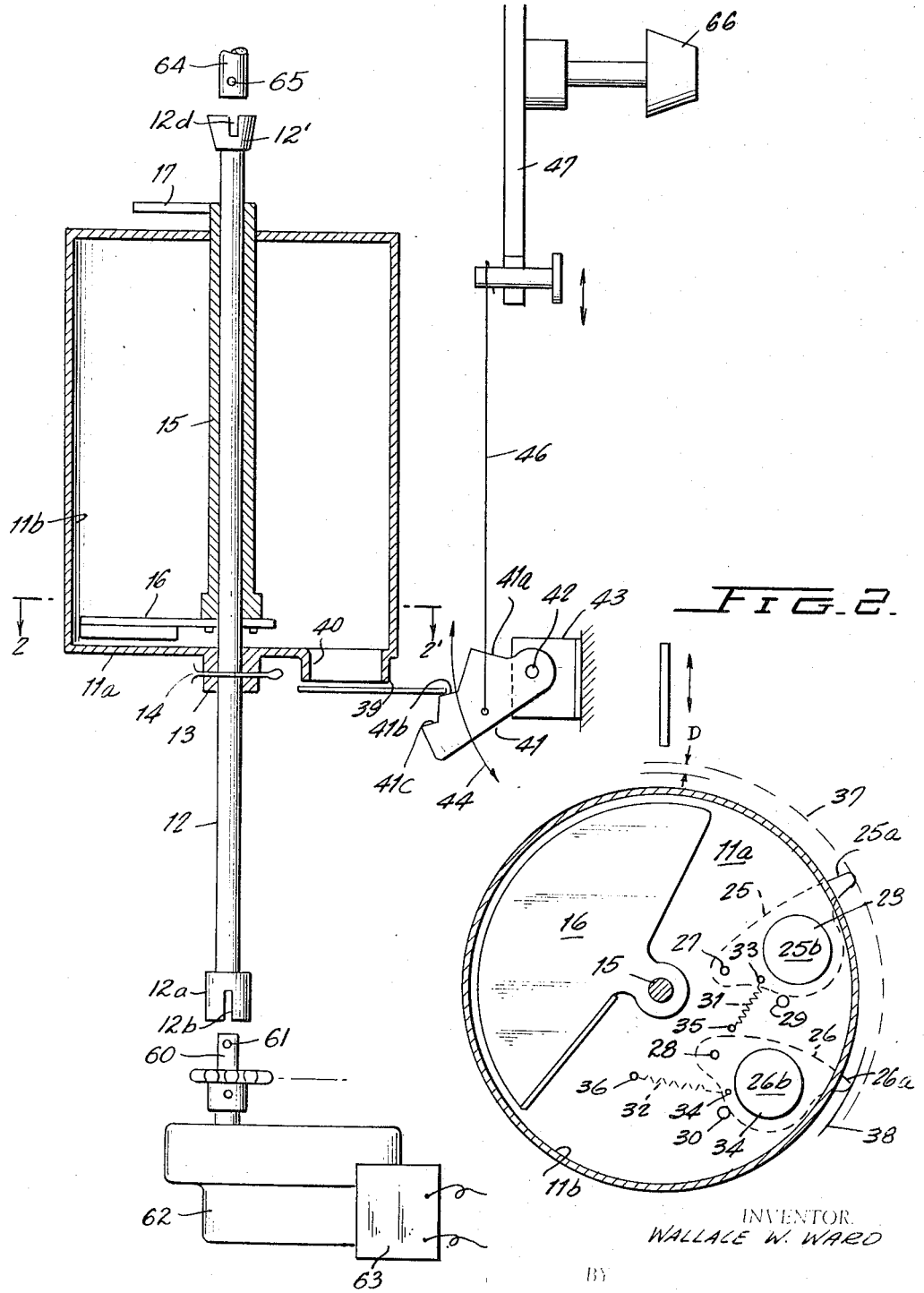

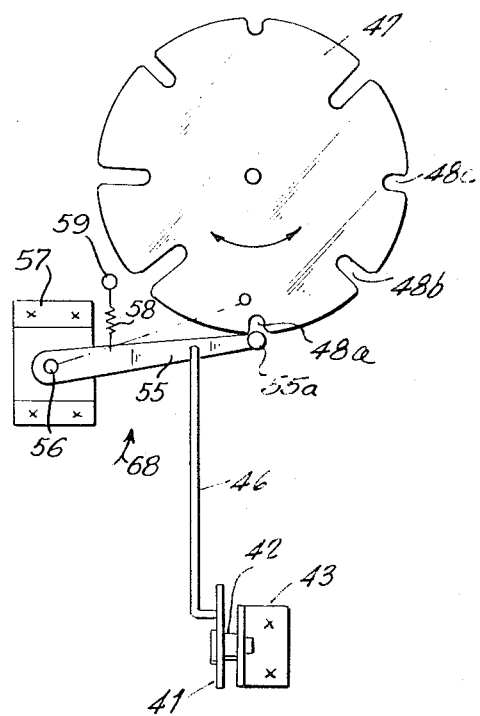
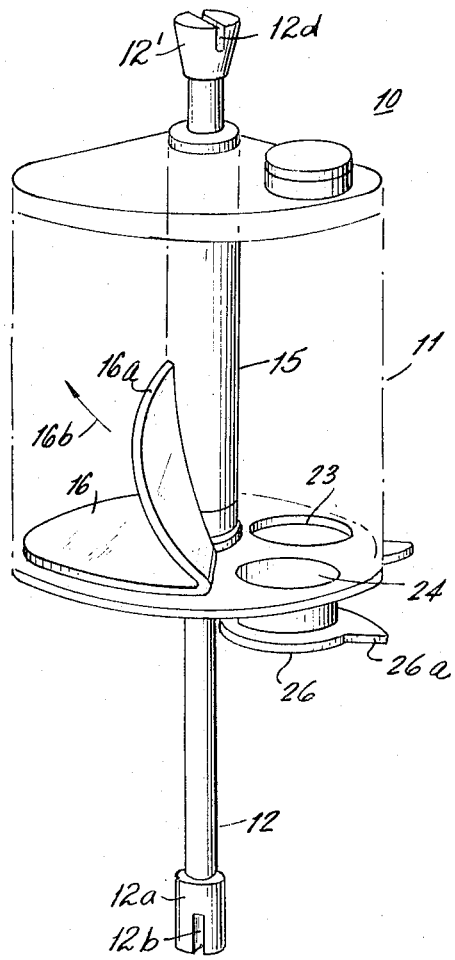
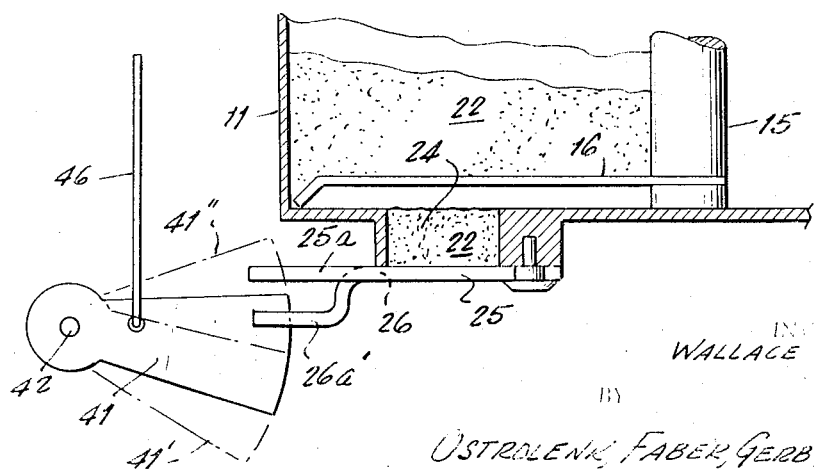

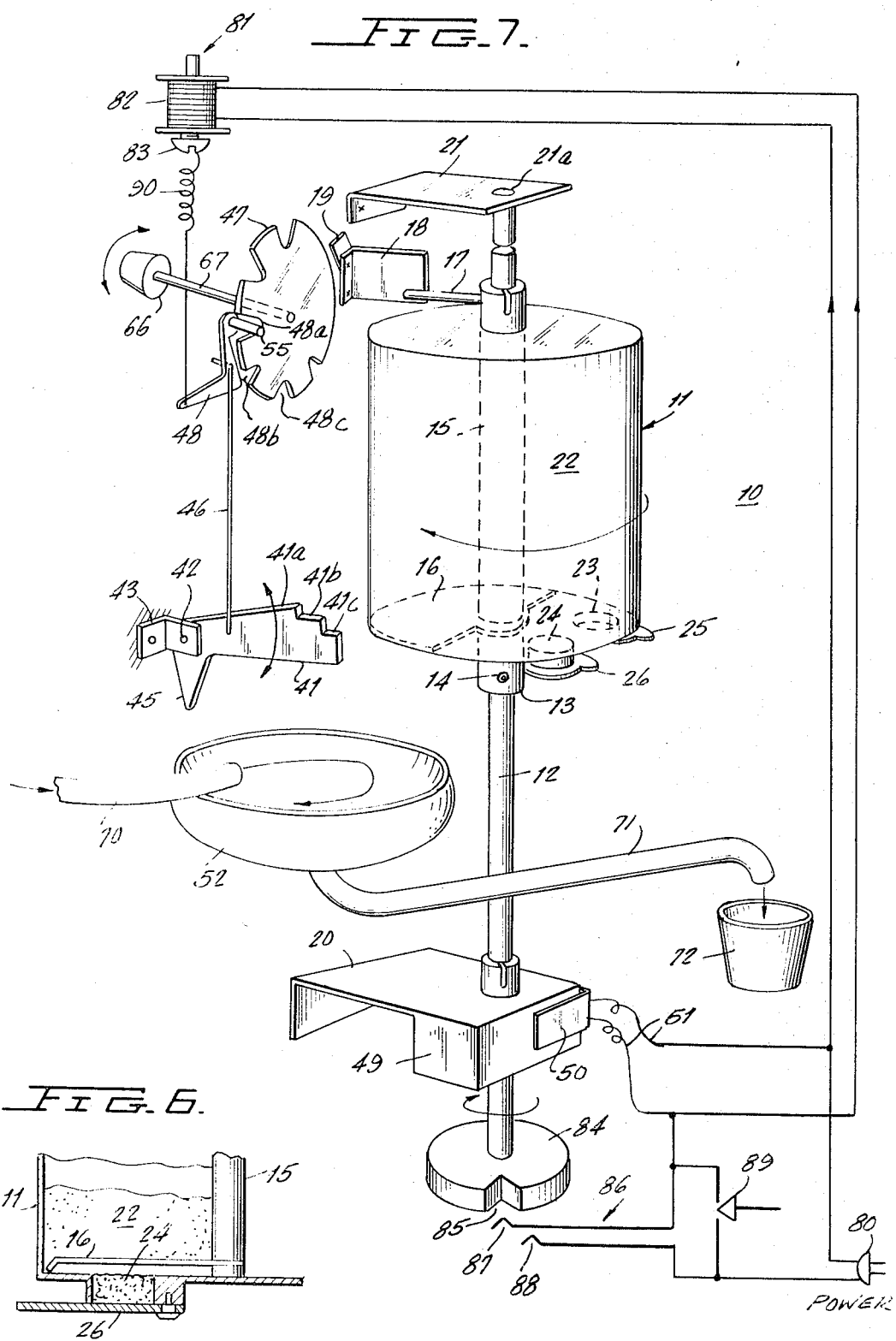

3,305,139
POWDERED MATERIAL DISPENSER
Wallace W. Ward, 28 Long Hill Lane, Chatham Township, Chatham, N.J. 07928
Filed Apr. 12, 1965, Ser. No. 447,193
6 Claims. (Cl. 222—168.5)

The instant invention relates to dispensing means and more particularly to a novel means for dispensing powdered material such as, for example, a powdered food product wherein the dispensing means automatically measures the amount of powdered material to dispense and further operates upon the powdered material within the dispenser preparatory to the dispensing operation so as to prevent lumping, clotting, or caking of the stored powdered material.

Powdered material dispensers find widespread use in an extremely large range of applications. One such application for which the instant invention finds itself specifically adapted is that of dispensing a powdered food material. For example, in the automatic vending machine field, it is quite common to find dispensers employed for the purpose of dispensing powdered food materials such as, for example, sugar, cream, coffee, and the like.

The design problems involved in the handling of such powdered materials, and especially in the handling of powdered milk and cream substitutes, result primarily from the highly hygroscopic nature of such powders. Powders of this type are extremely prone to instant reconstitution in the atmosphere of heat and moisture. This characteristic manifests itself in a variety of forms. For example, powder which is contained within a dispenser means canister for only relatively short periods of time will lump and clot together, making smooth, controlled flow of the powder difficult, or even impossible. Any chute, door, orifice, or other such device which may be employed to convey powder from the dispensing means cannister to the vending machine mixing station which may, for example, be a trough, area or bowl, will normally collect a residual coating of such powder and during the delivery or flow of water, either hot or cold, will be partially reconstituted, producing a sticky, gummy covering over the area or areas of the mixing stations as described. Such a coating acts to inhibit the flow of subsequent metered amounts of powder, thus serving to accumulate still more powdered material to a point where any further dispensing operations of the powdered material is significantly or totally reduced.

Typical dispenser means are designed so as to contain a substantial amount of the powdered material to be dispensed and such dispenser means are normally designed to take full advantage of the forces of gravity to assist the dispenser means in the dispensing or issuance of the powdered material. Such devices which proportion the flow or issuance of the powdered material and are designed to take advantage of gravitational forces, provide an operation whereby the powdered material at the base of the dispenser means housing, or cannister, is dispensed and simultaneously replaced by the powdered material lying immediately above it. Such devices are rendered inoperative due to a tunnelling condition which is the term typically employed to identify a phenomenon wherein static material positioned above the dispensing station adheres or fuses together such that the cohesive strength of the resulting somewhat solidified mass is more than sufficient to resist gravitational forces and thereby bridges over the dispenser station causing an occlusion or rarification at the dispenser means exit orifice, or opening. All of the above disadvantages enumerated individually or collectively render present day dispensing devices either partially or totally inoperative, thereby necessitating a device of such design to overcome these problems.

The instant invention discloses a novel dispensing means which overcomes all of the above enumerated disadvantages, while at the same time providing a dispensing operation of powdered material wherein a variety of discrete amounts may be metered by the device by virtue of an automatic selection means.

The instant invention is of a rotatably mounted dispenser means operated under control of motor and control means for rotation to perform the dispensing operation. Shielding means is provided within the rotatably mounted dispensing means and is mounted coaxially with said dispensing means housing adjacent to the floor of said housing. The floor is so arranged as to provide a plurality of cavities, or compartments, each being open at its lower end and adapted for receiving the powdered material to be dispensed. The opening of each compartment is provided with rotatably mounted door means, each of said door means having projecting tabs or ears extending in an outward radial direction. The projecting ears of each of said doors vary in length relative to one another. All of said door means are provided with suitable bias means for normally biasing the doors so as to seal its associated compartment opening.

Adjustable stop latch means is provided which is pivotally mounted to suitable stationary support means and is arranged under control of suitable selection means to move into a plurality of selected blocking positions for said door means for the purpose of opening none, one, or a combination of said plural door means, in order to effect the dispensing operation. The stop latch means may preferably be operated by a manually operable selector knob coupled to the stop latch means by a suitable connecting link. The selector knob has connected thereto notched disc means rotatable under control of said selector knob for the purpose of positioning an arm which controls the movement of the connecting link. The depth of the position of the arm is dependent upon the notch on the notch disc with which it is associated at any given instant.

In the case where it is desired to dispense a powdered ingredient, such as, for example, powdered cream, powdered coffee, granulated sugar, and the like, which ingredients are typically utilized in an automatic vending machine, the control knob is normally provided along the vertical front wall of the vending machine housing. Suitable visual display means are coupled to the control knob for the purpose of indicating the selection made by the party operating the vending machine. In the case where the vending machine is designed to provide a hot drink such as coffee, typical selections may, for example, be black coffee, no-sugar, black coffee, one-sugar, black coffee, two-sugars, cream, no-sugar, cream, one-sugar, and cream, two-sugars, for example. By setting the selector knob the amount of sugar desired is set. The appropriate position is indicated by the visual display means. When in the proper position the arm operating the connecting link is seated against the associated notch of the notched disc which relates to the amount of sugar which has been selected by the party using the machine. This position establishes the vertical position of the connecting link, thereby establishing the angular position of the stop latch means.

After the selection of the coffee drink with the desired ingredients, and upon insertion of the appropriate coin, the machine begins its automatic operation, one phase of which controls the dispensing of powdered cream, for example. During this phase of the operation, the control means energizes the motor means, rotating the cannister means. Depending upon the position of the stop latch means, none, one, or two door means, for example, will be opened so as to dispense metered amounts of powdered cream into a mixing bowl, for example.

The shield means provided near the floor of the dispensing means cannister is arranged to rotate relative to the cannister and in rotating serves to tumble or activate the powdered material within the cannister to prevent any tunneling or "fixing" of the powdered material. During the time when the door means are moved to the open or unsealed position, the shield means rotates relatively (actually it is stationary) so as to cover the compartments containing the powdered material being dispensed in order to prevent any powdered material beyond any metered amount from exiting through the unsealed compartment. Subsequent to the resealing of each of the opened compartments, the shield means is rotated to a position uncovering the compartments, thereby allowing the powdered material remaining in the cannister to refill any, or all of the emptied compartments in readiness for a subsequent dispensing operation. The dispensing means may be employed for the purpose of dispensing any powdered material and while lending itself advantageously to the dispensing of the powdered food stuffs normally employed in vending machines, the dispensing means may nevertheless be employed in any application requiring the dispensing of a powdered material.

By providing an arrangement which seals the dispenser means cannister during all periods with the exception of the dispensing operation which takes place over a small period of time, the device precludes as much as possible any ambient moisture contact with the powdered material.

The shield means provides the function of agitation and tumbling or otherwise stirring of the residual powdered material within the cannister means to discourage lumping, tunneling and bridging.

The arrangement presents no door, chute, slide guide or other device to the immediate area of rising water vapor (in the case of a hot drink such as coffee) for any period other than the instant of delivery of the powdered material which takes place over an extremely brief period of time.

The shield means and dispenser rotatable door means are so arranged as to be essentially self-cleaning to effectively discourage build up of any residual gummy deposits of powdered material in the interim between normal cleanings of the device so as to reduce maintenance and repair to an absolute minimum.

It is therefore one object of the instant invention to provide a novel dispensing means for dispensing selected amounts of a powdered material.

Another object of the instant invention is to provide novel dispensing means for powdered materials, foodstuffs and the like, comprising selectively controlled door means operable in a variety of combinations for delivering a plurality of metered amounts of the powdered material.

Still another object of the instant invention is to provide novel dispensing means for powdered materials, foodstuffs and the like, comprising novel rotatable shield means for limiting the delivery of the powdered material and further for agitating and tumbling the powdered material contained within the dispenser means cannister to prevent lumping, bridging or tunneling of the powdered material stored therein.

Still another object of the instant invention is to provide novel dispensing means for powdered materials, foodstuffs and the like, comprising novel rotatable dispensing means provided with a plurality of compartments arranged in the floor thereof and having rotatable door means selectively movable by adjusting stop latch means for the purpose of controlling the amounts of powdered material dispensed.

Still another object of the instant invention is to provide novel dispensing means for powdered materials, foodstuffs and the like, comprising novel rotatable dispensing means provided with a plurality of compartments arranged in the floor thereof and having rotatable door means selectively movable by adjustable stop latch means for the purpose of controlling the amounts of powdered material dispensed and further including novel shield means for sealing the compartments during the dispensing operation, unsealing the compartments to permit refilling thereof and further agitating and tumbling the stored powdered material to prevent any bridging, tunnelling or lumping of the stored powder.

Still another object of the instant invention is to provide novel dispensing means for powdered material, foodstuffs and the like, comprising manually operable selector means having visual display means for controlling the amount of powdered material to be dispensed and simultaneously therewith providing a visual indication of the selection made by the operator.

These, and other objects of the instant invention will become apparent when reading the accompanying description and drawings in which:

FIGURE 1 is a side elevation, partially in cross-section, of a dispensing means designed in accordance with the principles of the instant invention.

FIGURE 2 is a top view of a portion of the dispenser means of FIGURE 1, taken along the lines 2—2'.

FIGURE 3 shows another side elevational view of the selector means, a portion of the dispenser means shown in FIGURE 1.

FIGURE 4 is a perspective view of the cannister means of FIGURE 1.

FIGURE 5c shows a side view of an alternative arrangement for the door members of FIGURES 5a and 5b.

FIGURE 6 shows a sectionalized portion of the cannister means of FIGURE 1 in greater detail, with the arrangement being an elevation view of the section shown.

FIGURE 7 is a perspective view showing the entire dispenser means of FIGURE 1.

Figure 5A:
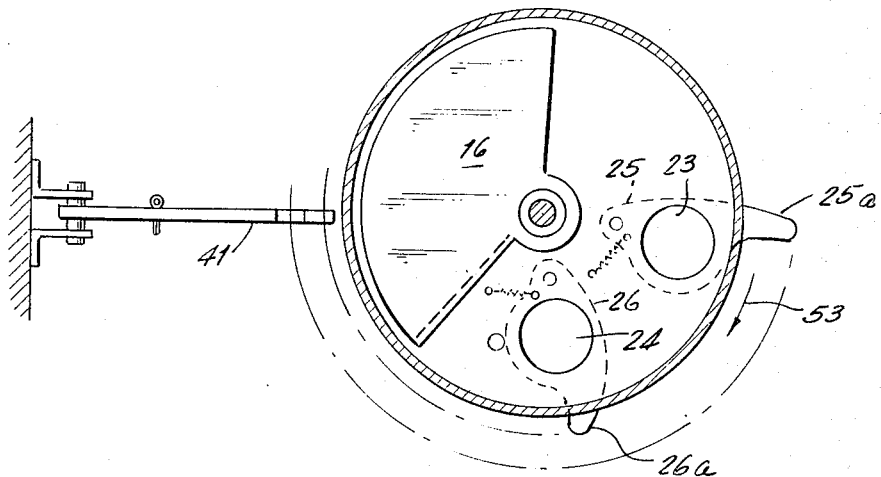
FIGURE 5a shows the arrangement of FIGURE 2 when the dispenser means is in the refilled position prior to the dispensing operation.

Referring now to the drawings, and more particularly to FIGURES 1, 4 and 7, a dispensing means 10 is shown therein as being comprised of a substantially annular shaped cannister 11, provided with an axially aligned opening so as to be axially disposed upon a vertically aligned shaft 12 with the axes of the cylinder and the shaft being congruent. A hub 13 is provided at the base, or floor 11a of cannister 11 and is further provided with a suitable opening for receiving a set screw or pin 14 or other suitable fastening means, on which is threaded through hub 13 and shaft 12 to key rotation of shaft 12 to the cannister 11. A tubular sleeve 15 has a semicircular spatulate member 16 (also hereinafter referred to as shield member 16) affixed thereto by any suitable fastening means. The shield member 16 is disposed so as to be substantially parallel to cannister floor 11a and above and in close proximity to the floor 11a. The dimensions of the shield member are such as to extend radially to a point just inside the wall 11b of cannister 11. The shield member is provided with an upturned portion 16a which is designed to agitate the powdered material within container 11 during the time in which a dispensing operation is being performed. This agitation acts to prevent any "caking" of the material and thereby insures free flow of the powdered material during each dispensing operation. The tubular sleeve 15 is mounted concentrically with vertical shaft 12 and is free to rotate independently of shaft 12, as is shaft 12 independent to rotate freely of tubular member 15. Tubular member 15 is provided at its upper end with a pin 17 projecting radially outward from member 15 and arranged to engage and be constrained by a stationary projection member 18 secured to the front wall 19 of the housing for the dispensing means which, for example, may be the front door or front face of an automatic dispensing machine.

The shaft 12 is provided at its lower end with a coupling member 12a having at least one notch 12b contained therein for the purpose of receiving a drive shaft 60 which is provided with a projection 61 to mate with notch 12b for the purpose of imparting rotation of drive shaft 60 to driven shaft 12. The drive shaft 60 is operated by a motor means 62 under control of any suitable control means 63 which is coupled to a power source and which operates to energize the motor upon the initiation operation. For example, in the vending machine application, upon deposit of the coin and selection of the particular drink desired, the control means 63 is designed to energize the motor means 62 in order that the dispensing operation may be performed.

The motor and control means 62 and 63, respectively, are mounted in any convenient manner to a bracket means 20 which, in turn, may have one end thereof 21a secured to the vertical sidewall 19 of the vending machine (for example), only a section of which has been shown for purposes of clarity.

The upper end of shaft 12 is provided with a coupling member 12' similar to the coupling member 12a and having a similar notch 12d contained therein for receipt of a shaft 64 having a projecting pin 65 extending radially outwardly therefrom. These elements mate, as can best be seen in FIGURE 7, and are provided for the purpose of rotatably positioning the cannister 11.

The shaft 64 is rotatably mounted within an aperture 21a provided in a bracket 21, the forward end of which is suitably secured to a vertical wall of the vending machine, for example.

Thus, when shaft 12 is rotated under control of motor 62 and drive shaft 60 the cannister 11 rotates therewith due to the linking of pin 14, while at the same time the shield member 16 coupled to hollow tubular member 15 is restrained from moving due to abutment of the projection 17 against the extension, or bracket 18. Thus, the shield member 16 remains stationary relative to the upper and lower brackets 21 and 20, respectively. However, there is relative rotary motion as between shield member 16 and cannister 11. The movement of the shield member 16 within the cannister 11 provides motion, tumbling and agitation of the powdered material 22 contained within the cannister to prevent tunnelling or bridging of this powdered material.

The floor 11a of cannister 11 is provided with a plurality of compartments 23 and 24 formed so as to project vertically downward from floor 11a. Each compartment is angularly disposed around the cannister floor 11a. Referring particularly to FIGURES 2 and 4, each compartment is provided with a cooperating door 25 and 26, respectively, with each of said doors being pivotally mounted on a center pin 27 and 28, respectively, and urged against stop pins 29 and 30, respectively, by means of spring biasing member 31 and 32, respectively, which are mounted at one end to doors 25 and 26, respectively, at the points 33 and 34, respectively, and at their other ends to cannister floor 11a at 35 and 36, respectively. Each of the doors 25 and 26 is provided with a projecting ear, or lobe, 25a and 26a, respectively, with the lobes being so arranged that the lobe 25a is progressively greater in length than the lobe 26a by a total difference D which can best be appreciated from the phantom arcs 37 and 38, shown in FIGURE 2.

The upper surface 25b and 26b, respectively, of each door 25 and 26 makes sliding contact with the lower lip 39 (see FIGURE 1) of the boss 40 which forms the compartments 23 and 24. Thus, with the cannister 11 in the position shown in FIGURES 1 and 4 with the doors being in the sealed position enables the powdered material to enter into the compartments 23 and 24. This is freely permitted since the shield member 16 does not cover the upper openings of the compartments 23 and 24.

Referring particularly to FIGURES 1, 3 and 5–7, it can be seen that an attenuated flag 41, hereinafter referred to as an adjustable stop latch member 41, is mounted by a pivot pin 42 to a substantially L-shaped bracket 43 which, in turn, is secured to one vertical wall of the vending machine housing, for example. The adjustable stop latch member 41 is permitted to rotate freely about pivot pin 42 and through the arc 44. The motion of member 41 is limited in the downward direction by a tab 45 which will abut the vertical side wall 19 when member 41 reaches a predetermined angular position. The movement in the upward angular direction experienced by the adjustable stop latch member 41 is limited by the linking member 46 which cooperates with a selector disc assembly to so position the adjustable stop latch member 41. The adjustable selector disc assembly 65 is comprised of a manually operable control knob 66 coupled by means of a shaft 67 through the vertical side wall 19 and is in turn secured at its opposite end to a selector disc member 47 which can best be seen in FIGURES 1, 3 and 7. This selector disc 47 is rotatable with the rotation of manually controlled selection knob 66 for the purpose of rotating the selector disc 47 to a plurality of discrete angular positions.

Cooperating with the selector disc 47 is a spring biased lever member 55 pivoted by means of a pin 56 to a bracket 57 secured to the vertical side wall 19. A spring means 58 has one end therof secured to a point intermediate the arm 55 and another end thereof secured to the vertical side wall at 59. The bias member operates so as to rotate the arm 55 in the counterclockwise direction, as shown by the arrow 68 of FIGURE 3. This causes its free end 55a comprising a pin to enter into one of the notches 48a–48h provided at discrete angular positions about the selector disc 47. The depth of each notch can be seen to vary among these notches and acts to determine the amount of counterclockwise rotation which the biased arm 55 will experience. This rotational movement of arm 55 is imparted to the connecting link 46 to move it vertically upward or downward in the direction shown by arrows 69 and thereby determines the angular position of the adjustable stop latch means 41.

The adjustable stop latch means 41 is provided with a series of notches 41a, 41b and 41c aranged in substantially a step-like fashion with the arcuate surface adjacent each notch being a different radial distance away from the pivot pin 42. These arcuate surfaces are disposed to interfere with, or block the path of rotation of the doors 25 and 26 by abutting the ears 25a and 26a in a selected manner.

Figure 5B:
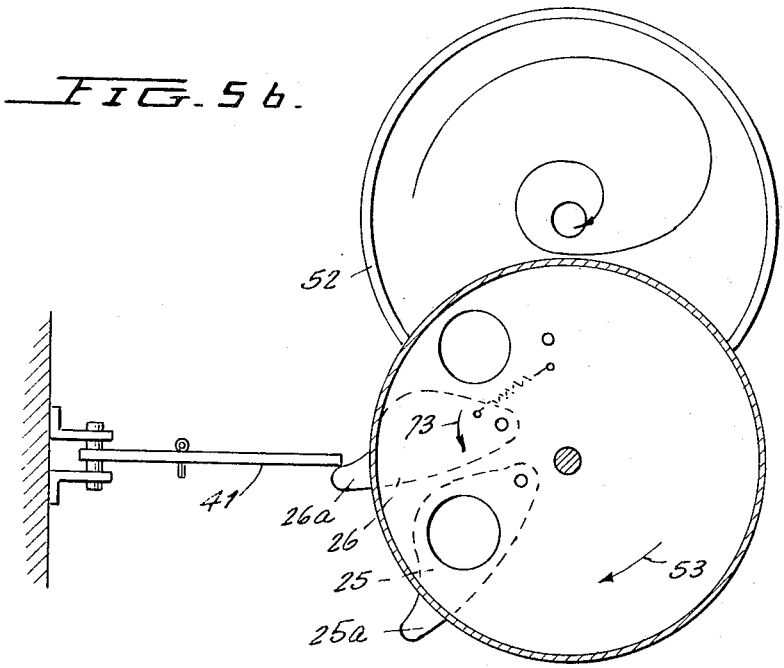
FIGURE 5b shows the arrangement of FIGURE 2 when the dispensing means is undergoing the delivery stage of the dispensing operation.

FIGURE 5c shows an alternative arrangement for the door members 25 and 26 and the flag member 41 covered in FIGURES 5a, 5b and 7. It should be noted in FIGURE 5c that the flag 41 is designed to pivot about pin 42 in the same manner as was previously described. However, flag 41 of FIGURE 5c need not be notched in the manner shown in FIGURES 1 and 7, but has the simple configuration as shown. In order to accommodate for selective openings of the door members 25 and 26, door member 25 has the identical configuration in FIGURE 5c as that shown in FIGURES 1, 5a and 7. Door member 26, however, has its projecting ear 26a' bent in the manner shown so that it is a spaced distance below the ear 25a of door 25, i.e., ear 26a' is at a different height or level relative to ear 25a. For operation of this embodiment, when the flag member 41 is in dotted line position 41' it does not interfere with either ear 26a' or 25a. This position constitutes the no-cream (or no-sugar) position. When the flag member 41 is in the solid line position, shown in FIGURE 5c, it interferes only with the ear 26a', and not with the ear 25a, so that only one-cream (or one-sugar) is dispensed. With the flag member in the dotted line position 41'' there is interference with both ears 25a admix all of the ingredients so that the materials are dispensed. Thus, it can be seen that a simpler flag member 41 can be provided simply by suitably bending one of the door member ears so as to be displaced in height relative to the remaining door member ear to provide for selective dispensing.

In the case of a vending machine application, the dispensing machine may be so arranged as to deliver or dispense the powdered material into a mixing bowl 52, shown in FIGURE 7, which is designed to receive all of the ingredients such as, for example, the coffee syrup (or powder), the powdered cream, sugar and hot water which may be received through a conduit 70 and which enters the mixing bowl through the opposite end of this conduit to provide a swirling operation in order to adequately admix all of the ingredients so that the materials are thoroughly mixed when passing through the exit tube 71 into the coffee cup 72.

The operation of the instant invention is as follows:

Upon initiation of a vending machine operation and assuming that the cannister 11 is provided with a suitable powdered food ingredient 22, shown in FIGURE 7, the control unit 63 acts to energize motor 62 in order to impart rotation to the vertically aligned shaft 12. This ultimately causes the cannister 11 to rotate in the clockwise direction, as shown by the arrow 53 in FIGURE 5a. It should be understood that the position of FIGURE 5a is the starting position, that is, the position in which the dispensing machine operation is to begin. The cannister 11 continues its rotation from the position shown in FIGURE 5a to the position shown in FIGURE 5b. In this position the compartments 23 and 24 are beneath the shield member 16, thus effectively isolating the powdered material contained within these compartments from all of the powdered material which may be resting upon the upper surface of the shield member 16. As the rotation continues (none), one, or both of the ears 25a and 26a will engage adjustable stop latch member 41 and are rotated counterclockwise about their pivot points as shown by the arrow 73 so as to unseal or open an associated compartment and thereby deposit or drop the powdered material directly into the mixing bowl. 52. It can clearly be seen in FIGURE 5 that the opening of the compartment lies directly above the mixing bowl 52 when the door unseals itself or rotates away from it associated opening. There is shown therein the relationship and positioning between the shield member 16, the powdered material in the compartment 24 and the powdered material 22 which is resting above the shield means 16. It can clearly be seen that when the compartment door 26 opens, only the powdered material 22' will be dispensed therefrom.

The rotation of the cannister 11 continues until the door tab 26a, for example, shown in FIGURE 5b, rotates a sufficient amount in the clockwise direction, as shown by arrow 73 so as to disengage or release itself from the adjustable stop latch member 41 and it is then swung closed by its spring bias member 32 which acts to seal its compartment 24 in readiness for the next dispensing operation and also acts to shear off any residual powdered material on the upper surface of door 26 due to the frictional sliding engagement between the upper surface of door 26 and the lip 39 of the compartment.

As can clearly be seen, the number of compartments which are passed or opened for a given machine cycle is dependent only upon the angular position of the attenuator flag 41 which, in turn, is dependent on the depth of the pin 55 within the selector disc notches 48a–48h of the selector disc 47.

The selector disc 47 may further be so designed as to cooperate with an opening, or window (not shown), in the vending machine housing so as to provide a visual display of the selection made by the vending machine user. For example, considering FIGURE 3, a visually readable display 74 may be provided and associated with the notch 48f with the display 74 cooperating with a window in the vending machine so as to provide a visual indication that the selector knob 66 and hence the selector disc 47 is in the position in which one sugar will be provided. The positions around the selector disc may represent no sugar and two sugars, for example. Further, visual display information may be provided by coupling the selector disc with a coffee dispensing means and a cream dispensing means so that the selections may be coffee black, coffee cream, coffee black one sugar, coffee black two sugars, coffee cream one sugar, and coffee cream two sugars, thus necessitating a total of seven notches in order to provide suitable positions around the selector disc 47 by providing a second bias arm 55 arrangement and a second adjustable stop latch means for the cream (or coffee, or sugar) dispenser. All such selections would be performed by manual manipulation of the selector knob 66.

FIGURE 7 further includes the electrical circuitry by which the powdered dispensing means may be operated. The circuitry includes a suitable plug 80 connected into a local power source and electrically connected to the input leads 51 of motor 50, as well as to the coil 82 of a solenoid 81. The main shaft 12 is provided with a single cycle cam 84 near the lower end thereof, which cam is provided with a notch 85 for cooperation with a switch 86. Connected in parallel across the contacts 87 and 88 of switch 86 is a schematically shown switch 89 which represents closure of the electrical circuit when the appropriate coin is deposited into the vending machine.

The operation of the electrical circuit is as follows:

When the appropriate coin is deposited into the vending machine, switch 89 moves to the closed position so as to supply power to motor 51 and coil 82 of solenoid 81. The energization of motor 51 causes rotation of shaft 12 and cam 84. In the normally deenergized position, movable arm 87 of switch 86 is suitably biased as to enter the notch 85 in cam member 84, thereby open circuiting the electrical circuit. The closure of switch 89 causes rotation of shaft 12 and hence cam 84 which, in turn, causes movable arm 87 of switch 86 to be lifted out of notch 85 and thereby urged into engagement with stationary contact arm 88. Switch 89 is preferably a slow-to-release switch which remains closed for a period sufficient to allow contact arm 86 to leave notch 85 and hence close the electrical circuit. Thus, when switch 89 opens, a continuous electrical path still exists between the power source 80 and motor 50 and solenoid 81. As cam 84 completes one full rotation, the movable arm 87 of switch 86 enters notch 85 causing opening of switch 86 and deenergization of motor 50 and solenoid 81.

The energization of solenoid coil 82 causes its associated armature 83 to move vertically upward so as to draw the pin 48a of member 48 into one of the notches provided in disc 47. The spring means 90 guarantees that the solenoid 81 will properly seat pin 48a within the associated notch regardless of the depth of the notch. At the completion of one rotation of cam 84, which leads to the deenergization of solenoid coil 82 and motor 51 the armature 83 moves vertically downward releasing pin 48a from its associated notch, thereby permitting free rotation of the manually settable notch 66.

It can therefore be seen that the instant invention provides a novel automatic dispensing means which is arranged to automatically fill compartments used during the dispensing operation, selectively open and/or seal these compartments to dispense predetermined amounts of a powdered ingredient, seal these compartments off from the main supply of powdered ingredients so as to maintain the requirements of the selected amounts and to automatically close the compartments prior to the refill of the compartments with the replenished powdered ingredient. The refill operation is performed simply by rotation of the cannister 11 to a point where shield 16 no longer seals the compartments 23 and 24. The rotation of the shield member 16 relative to the cannister 11 acts to tumble, agitate, or otherwise break up the powdered material so as to prevent any tunneling, bridging or solidifying of the powdered material within the cannister.

The rapid operation of the dispensing delivery phase allows the lower openings of the cannister 11 to be exposed to the moisture and heat in the region of the mixing bowl 52 for only an extremely brief period of time so as to further protect the powdered ingredient against the absorption of moisture.

The selector device is so keyed with the dispensing means that the choice of powdered ingredient quantities may be indicated by a visual display means in order to further simplify the operation of the dispensing means. While the dispensing means described herein makes specific reference to automatic machines such as, for example, coffee vending machines, it should be understood that the dispensing device of the instant invention is applicable to any situation wherein a powdered material of a plurality of quantity or dosages is to be dispensed for one purpose or another into a receiving container. It should also be understood that more than two such compartments may be provided in the cannister floor and also less than two compartments may likewise be provided with the ultimate choice being dependent only upon the needs of the user.

Although there has been described a preferred embodiment of this novel invention, many variations and modifications will now be apparent to those skilled in the art. Therefore, this invention is to be limited, not by the specific disclosure herein, but only by the appended claims.

What is claimed is:

1. Dispenser means for powdered ingredients comprising rotatably mounted cannister means for housing a powdered material; rotatably mounted shield means positioned within and adjacent the floor of said cannister means; said cannister means having a plurality of compartments formed in the floor of said cannister means and projecting downwardly from said floor; a plurality of rotatably mounted door means each biased to seal an associated compartment; pivotally mounted, adjustable stop latch means arranged to open certain ones of said compartments upon rotation of said cannister means to dispense predetermined amounts of the powdered material; means abutting said shield means to position said shield above said compartments when said door means are opened and to remove said shield means from said compartments when the powdered material has been dispensed; said door means each having a projecting ear arranged to abut said stop latch means; the ears of said door means being of differing lengths.

2. Dispenser means for powdered ingredients comprising rotatably mounted cannister means for housing a powdered material; rotatably mounted shield means positioned within and adjacent the floor of said cannister means; said cannister means having a plurality of compartments formed in the floor of said cannister means and projecting downwardly from said floor; a plurality of rotatably mounted door means each biased to seal an associated compartment; pivotally mounted, adjustable stop latch means arranged to open certain ones of said compartments upon rotation of said cannister means to dispense predetermined amounts of the powdered material; means abutting said shield means to position said shield above said compartments when said door means are opened and to remove said shield means from said compartments when the powdered material has been dispensed; said door means each having a projecting ear arranged to abut said stop latch means; the ears of said door means being of differing lengths; said stop latch means having a notched means positionable to selectively open selected ones of said door means.

3. Dispenser means for powdered ingredients comprising rotatably mounted cannister means for housing a powdered material; rotatably mounted shield means positioned within and adjacent the floor of said cannister means; said cannister means having a plurality of compartments formed in the floor of said cannister means and projecting downwardly from said floor; a plurality of rotatably mounted door means each biased to seal an associated compartment; pivotally mounted, adjustable stop latch means arranged to open certain ones of said compartments upon rotation of said cannister means to dispense predetermined amounts of the powdered material; means abutting said shield means to position said shield above said compartments when said door means are opened and to remove said shield means from said compartments when the powdered material has been dispensed; manually operable selector means for selecting the amount of powdered material to be dispensed; connecting means linking said selector means and said stop latch means to position said stop latch means under control of said selector means; said selector means comprising a rotatable selector disc having notches of varying lengths arranged at discrete angular positions around said disc; a pivotally mounted arm biased to abut the periphery of said selector disc; said connecting means being pivotally linked to a point intermediate the ends of said pivotally mounted arm.

4. Dispenser means for powdered ingredients comprising rotatably mounted cannister means for housing a powdered material; rotatably mounted shield means positioned within and adjacent the floor of said cannister means; said cannister means having a plurality of compartments formed in the floor of said cannister means and projecting downwardly from said floor; a plurality of rotatably mounted door means each biased to seal an associated compartment; pivotally mounted, adjustable stop latch means arranged to open certain ones of said compartments upon rotation of said cannister means to dispense predetermined amounts of the powdered material; means abutting said shield means to position said shield above said compartments when said door means are opened and to remove said shield means from said compartments when the powdered material has been dispensed; said door means each having a projecting ear arranged to abut said stop latch means; the ears of said door means being of differing lengths; said stop latch means having a notched means positionable to selectively open selected ones of said door means; means for receiving said powdered material being positioned beneath said compartments when said door means are opened.

5. Dispenser means for powdered ingredients comprising rotatably mounted cannister means for housing a powdered material; rotatably mounted shield means positioned within and adjacent the floor of said cannister means; said cannister means having a plurality of compartments formed in the floor of said cannister means and projecting downwardly from said floor; a plurality of rotatably mounted door means each biased to seal an associated compartment; pivotally mounted, adjustable stop latch means arranged to open certain ones of said compartments upon rotation of said cannister means to dispense predetermined amounts of the powdered material; means abutting said shield means to position said shield above said compartments when said door means are opened and to remove said shield means from said compartments when the powdered material has been dispensed; said door means each having a projecting ear arranged to abut said stop latch means; the ears of said door means being of differing lengths.

6. Dispenser means for powdered ingredients comprising rotatably mounted cannister means for housing powdered material; rotatably mounted shield means positioned within and adjacent the floor of said cannister means; said cannister means having a plurality of compartments formed in the floor of said cannister means and projecting downwardly from said floor; a plurality of rotatably mounted door means each biased to seal an associated compartment; pivotally mounted adjustable stop latch means arranged to open certain ones of said compartments upon rotation of said cannister means to dispense predetermined amounts of powdered material; means abutting said shield means to position said shield means above said compartments when said door means are opened and to remove said shield means from said compartments when the powdered material has been dispensed; said door means each having a projecting ear arranged to abut said stop latch means; the ears of said door means being of differing lengths; said stop latch means being rotatably movable to selectively open selected ones of said door means; means for receiving said powdered material being positioned beneath said compartments when said door means are opened.

References Cited by the Examiner

UNITED STATES PATENTS 2,606,693  8/1952  Phillips _____ 222—168.5
2,910,212  10/1959  Kerr _____ 222—168.5

ROBERT B. REEVES, *Primary Examiner.*

EVON C. BLUNK, *Examiner.*

N. L. STACK, *Assistant Examiner.*